(12) United States Patent
Ota et al.

(10) Patent No.: US 7,228,112 B2
(45) Date of Patent: Jun. 5, 2007

(54) MOBILE RADIO DEVICE

(75) Inventors: Yasuhiko Ota, Yokohama (JP); Makoto Noto, Yokohama (JP); Takamitsu Suzuki, Yokohama (JP); Masanori Kubota, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 601 days.

(21) Appl. No.: 10/311,363

(22) PCT Filed: Feb. 14, 2002

(86) PCT No.: PCT/JP02/01254

§ 371 (c)(1),
(2), (4) Date: Dec. 16, 2002

(87) PCT Pub. No.: WO02/084792

PCT Pub. Date: Oct. 24, 2002

(65) Prior Publication Data

US 2003/0190896 A1    Oct. 9, 2003

(30) Foreign Application Priority Data

Apr. 13, 2001    (JP)    ............................. 2001-115631

(51) Int. Cl.
*H04B 1/38*    (2006.01)
(52) U.S. Cl. ............... 455/90.3; 455/575.1; 455/575.4; 455/575.7; 455/575.3; 343/702; 343/713; 343/895; 343/900; 342/357.06; 342/352
(58) Field of Classification Search ............ 455/404.2, 455/456.1, 575.3, 575.1, 575.7, 90.3, 562.1, 455/347, 575.4; 343/702, 713, 895, 900
See application file for complete search history.

(56) References Cited

U.S. PATENT DOCUMENTS 5,469,177 A  * 11/1995 Rush et al. .................. 343/702
5,784,191 A  *  7/1998 Wood .......................... 359/308

(Continued)

FOREIGN PATENT DOCUMENTS

EP    1 037 391 A2    9/2000

(Continued)

*Primary Examiner*—Marceau Milord
(74) *Attorney, Agent, or Firm*—Pearne & Gordon LLP (57) ABSTRACT

In a portable radio device in which both an antenna for cell phone and an antenna for receiving GPS data are installed, an object of the present invention is to decrease influence of the antennas on one another with respect to deterioration of their radio performances.

According to the present invention, in a portable radio device in which an operating part housing (11) and a display part housing (12) are connected by way of a hinge part (13) in a freely foldable manner to conduct both telephone conversation and reception of GPS data, an antenna (20) for the telephone conversation is provided at one side of the operating part housing (11) in a lateral direction, and at the same time, an antenna (21) for receiving the GPS data is mounted to a base board (22) in the display part housing (12) in its end area at an opposite side to the hinge part (13). With this arrangement, both the antennas (20), (21) can be spaced from each other, and deterioration of their radio performances can be restrained.

16 Claims, 6 Drawing Sheets

U.S. PATENT DOCUMENTS

| | | | | |
|---|---|---|---|---|
| 5,945,953 A * | 8/1999 | Tsuda et al. | | 343/702 |
| 5,963,180 A * | 10/1999 | Leisten | | 343/895 |
| 6,073,033 A * | 6/2000 | Campo | | 455/566 |
| 6,100,847 A * | 8/2000 | Sointula | | 343/702 |
| 6,151,485 A * | 11/2000 | Crisp | | 455/575.4 |
| 6,246,373 B1 * | 6/2001 | Aoki | | 343/702 |
| 6,342,859 B1 * | 1/2002 | Kurz et al. | | 343/702 |
| 6,424,300 B1 * | 7/2002 | Sanford et al. | | 343/702 |
| 6,754,507 B2 * | 6/2004 | Takagi | | 455/550.1 |
| 6,898,282 B2 * | 5/2005 | Cho | | 379/428.01 |

FOREIGN PATENT DOCUMENTS

| | | |
|---|---|---|
| GB | 2 322 248 A | 8/1998 |
| JP | 04164276 A | 6/1992 |
| JP | 06289118 A | 10/1994 |
| JP | 11098572 A | 4/1999 |
| JP | 11177485 A | 7/1999 |
| JP | 2000151452 A | 5/2000 |
| JP | 2000349527 A | 12/2000 |
| JP | 2001099674 A | 4/2001 |

* cited by examiner

MOBILE RADIO DEVICE

BACKGROUND OF THE INVENTION

1. Field of the Invention

The present invention relates to a portable radio device, such as a cell phone set, a data communication terminal device, etc. provided with an antenna for GPS (Global Positioning System) which can receive location data by the GPS.

2. Description of the Related Art

Because a portable radio device such as a cell phone set, a handy type cell phone set, a mobile data communication terminal device has become popular, and is people carrying the portable radio devices have increased, there are more and more cases in which reports of accidents or crimes are issued from the portable radio devices. However, in contrast with a fixed telephone set which is installed at home, a place where the report has been issued, in short, a place where the accident has happened cannot be known from the portable radio device, although only the telephone number can be detected. Therefore, it is necessary to confirm about the place with a reporter of the accident. In this case, it happens many times that the reporter of the accident is unable to tell the place of occurrence of the accident, when the reporter is not a resident of the place, but he is a simple passenger.

Under the circumstances, in recent years, there has been proposed a system in which function of obtaining location data of individuals with high accuracy is installed in the portable radio device, and the location data of the individuals are urgently communicated to a police or a fire department by way of a base station of a cellular phone or the like. In this case, it is advantageous that function of receiving GPS radio wave making use of a GPS satellite which has been used for car navigation is installed in the portable radio device, thereby to obtain location data of individuals with an accuracy of about 125 m in radius.

Figure 10:
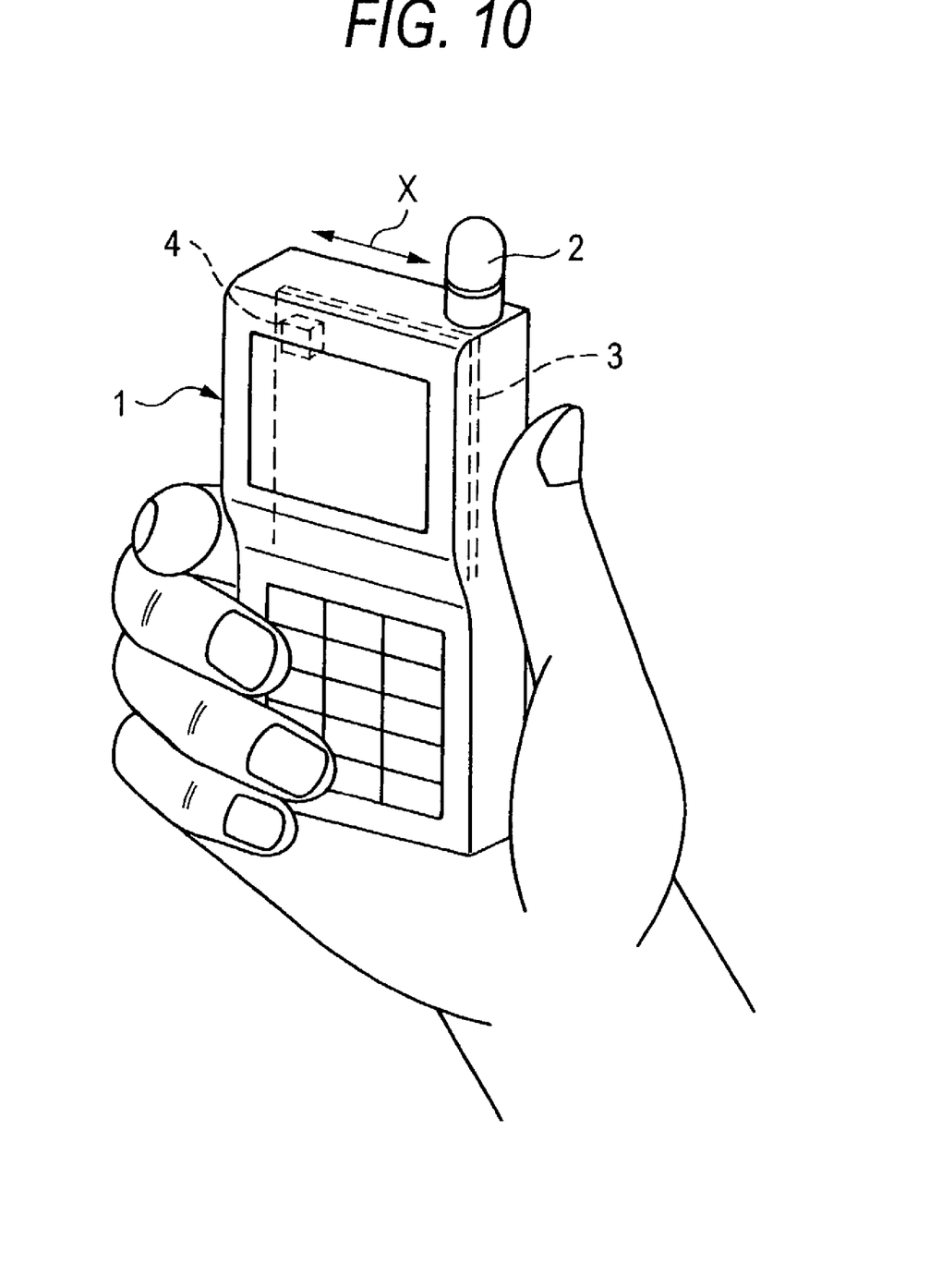
FIG. 10 is a portable radio device provided with a plurality of antennas in a state held with hand.

FIG. 10 is an outside view of a portable radio device in which the function of receiving the GPS radio waves is installed. In this portable radio device 1, an antenna 2 capable of extending and contracting for cell phone which is used on occasion of telephone conversation is provided exclusively at one side of the portable radio device 1 in a lateral direction, and a chip antenna 4 for receiving the GPS radio waves which is mounted on an incorporated base board 3 is provided at the other side of the cell phone set 1 in a lateral direction, so that a distance X between the two antennas 2 and 4 may be as large as possible.

In case where the function of receiving GPS radio waves is installed in the portable radio device, since a frequency zone of the radio waves used for telephone conversation on the portable radio device is different from a frequency zone of the GPS radio waves, the individual antennas must be separately installed in the small portable radio device. However, in case where the two antennas are arranged close to each other, the radio performance of the respective antennas may be deteriorated, and therefore, it is necessary to arrange the two antennas as remote as possible from each other. Nevertheless, in the example as shown in FIG. 10, a distance between the two antennas 2 and 4 is limited to a lateral width of the portable radio device at most, and deterioration of the radio performance will not be avoided.

Moreover, there are some portable radio devices having function as a transceiver in addition to the function as telephone, and it is necessary to install, in the same small housing, an antenna for short-range wireless communication for the case where the portable radio device is used as the transceiver, separately from the above described two antennas 2, 4. Therefore, there is a problem that the three antennas in total must be arranged in a such a manner that the radio performance may not be deteriorated.

The portable radio device in recent years has become smaller and smaller, into such a size as can be housed in a man's palm. For this reason, almost all parts of the portable radio device are enclosed with a hand while the portable radio device is used, and so, there is a problem that when an antenna part is enclosed with the hand, transmitting and receiving performances of the antenna may be deteriorated.

The present invention has been made in view of the above described circumstances, and an object of the invention is to provide a portable radio device in which when both an antenna for cell phone and an antenna for GPS are installed, or an antenna for short-range wireless communication is installed in addition, bad effects on radio performance by the respective antennas will be decreased, and deterioration of the radio performance when the antennas are enclosed with hands can be avoided.

SUMMARY OF THE INVENTION

The above described object can be attained by providing a portable radio device comprising an operating part housing and a display part housing connected by way of a hinge part in a freely foldable manner to conduct both telephone conversation and reception of GPS data, characterized in that either one of the aforesaid operating part housing and aforesaid display part housing is provided with an antenna for the telephone conversation and the other is provided with an antenna for receiving the GPS data. By arranging, in this manner, the conversation antenna and the GPS data receiving antenna in separate part case bodies of the portable radio device of a foldable type, the two antennas are spaced from each other, and deterioration of the radio performance can be restrained.

The above described object can be attained by providing a portable radio device comprising an operating part housing and a display part housing connected by way of a hinge part in a freely foldable manner, and provided with a first call antenna for making a call as a phone, a second call antenna for making a call based on short-range wireless, and an antenna for receiving GPS data, characterized in that aforesaid first call antenna and the aforesaid second call antenna are provided on either one of the aforesaid operating part housing and aforesaid display part housing, and the aforesaid GPS data receiving antenna is provided on the other. By providing, in this manner, the first call antenna and the second call antenna on one of the part case bodies, while the GPS data receiving antenna is provided on the other of the part case bodies, the antennas are spaced from one another, and deterioration of receiving capability of the GPS data can be restrained.

The above described object can be further attained by providing a portable radio device comprising an operating part housing and a display part housing connected by way of a hinge part in a freely foldable manner to conduct both telephone conversation and reception of GPS data, characterized in that an antenna for the telephone conversation is provided at one side of the aforesaid operating part housing in a lateral direction, and an antenna for receiving the GPS data is mounted to a base board inside the aforesaid display part housing in an end area of the base board at an opposite side to the aforesaid hinge part. By locating a plurality of the antennas as remote as possible in the small portable radio device, in this manner, interference between the antennas can be restrained, and besides, since the GPS data receiving antenna is provided on the display part housing which is not the operating part housing to be carried by hand in a state where the portable radio device is used, deterioration of receiving capability of the GPS data can be further restrained.

In the above described structure, the aforesaid GPS data receiving antenna is preferably provided at the other side of the aforesaid display part housing in a lateral direction which is an opposite side displaced from the aforesaid one side. With this arrangement, the antennas are spaced more remote from one another, and deterioration of the radio performance can be further reduced.

The above described object can be attained by providing a portable radio device comprising an operating part housing and a display part housing connected by way of a hinge part in a freely foldable manner, and provided with a first call antenna for making a call as a phone, a second call antenna for making a call based on short-range wireless, and an antenna for receiving GPS data, characterized in that the aforesaid first call antenna and aforesaid second call antenna are provided on the aforesaid operating part housing, and at the same time, the aforesaid GPS data receiving antenna is provided on the aforesaid display part housing. By arranging in this manner, a plurality of the antennas are spaced from one another, and deterioration of the radio performance of the respective antennas can be restrained. At the same time, when the hinge part is opened to put the portable radio device into a state for use, the GPS data receiving antenna will not be covered with hand, and receiving characteristics of the GPS data will be improved.

In the above described structure, the aforesaid first call antenna is preferably provided at one side of the aforesaid operating part housing in a lateral direction, the aforesaid GPS data receiving antenna is mounted to a base board inside the aforesaid display part housing in an end area of the base board at the opposite side to the aforesaid hinge part, and the aforesaid second call antenna is provided on a base board inside the aforesaid operating part housing in an end area of the base board at the opposite side to the aforesaid hinge part and at the other side of the aforesaid operating part housing in a lateral direction opposite to the aforesaid one side. With this arrangement, a plurality of the antennas are spaced more remote from one another, and deterioration of the radio performance can be restrained.

More preferably, a distance between a rotation axis of the aforesaid hinge part and the aforesaid second call antenna is different from a distance between the aforesaid rotation axis and the aforesaid GPS data receiving antenna, and a length of the aforesaid operating part housing is different from a length of the aforesaid display part housing, so that the distance between the rotation axis of the aforesaid hinge part and the aforesaid second call antenna may be different from the distance between the aforesaid rotation axis and the aforesaid GPS data receiving antenna. With this arrangement, deterioration of the GPS data receiving performance in a closed state of the portable radio device can be further restrained.

In the above described structure, a radio circuit for making a call as a phone is mounted to the base board provided in the aforesaid operating part housing, and a radio circuit for receiving GPS data is mounted to the base board provided in the aforesaid display part housing. By mounting the two radio circuits to the separate base boards, interference between the two radio circuits will be restrained, and deterioration of the radio performance will be restrained.

More preferably, in the above described structure, there are provided shielding means for covering the aforesaid radio circuit for making a call as a phone and shielding means for covering the aforesaid radio circuit for receiving GPS data. With this arrangement, electromagnetic noise emitted from the radio circuits will be interrupted, and bad influences of the radio circuits on each other will be decreased.

Still more preferably, the above described portable radio device is characterized in that the aforesaid GPS data receiving antenna is mounted to the base board inside the aforesaid display part housing on a side of the display part. With this arrangement, the GPS data receiving antenna is directed to the GPS satellite in an open state of the portable radio device, and receiving capability will be enhanced.

Still more preferably, the above described portable radio device is characterized in that a design mark indicating a mounting position of the aforesaid GPS data receiving antenna is attached to a front face of the housing, and that a design mark indicating a mounting position of the aforesaid second call antenna is attached to a front face of the housing. This will make a user of the portable radio device conscious of the positions of the antennas, and can give a caution so as not to cover the antennas with hand.

Reference numerals 10, 30, 35, 40, 45 in the drawings represent portable radio device of a foldable type, 11 represents operating part housing, 12 represents display part housing, 13 represents hinge part, 14 represents a group of operating buttons, 15 represents display screen part, 16 represents microphone hole, 17 represents speaker hole, 20 represents antenna for telephone conversation, 20a represents distal end portion, 21, 36, 46 represent GPS data receiving antenna, 22, 23 represent base board, 24 represents radio circuit for cell phone, 25, 28 represent shielding member, 27 represents GPS radio circuit, 31, 41 represent design mark, 37, 47 represent antenna for short-range wireless communication.

DETAILED DESCRIPTION OF THE PREFERRED EMBODIMENTS

Now, an embodiment of the present invention will be described referring to the drawings.

Figure 1:
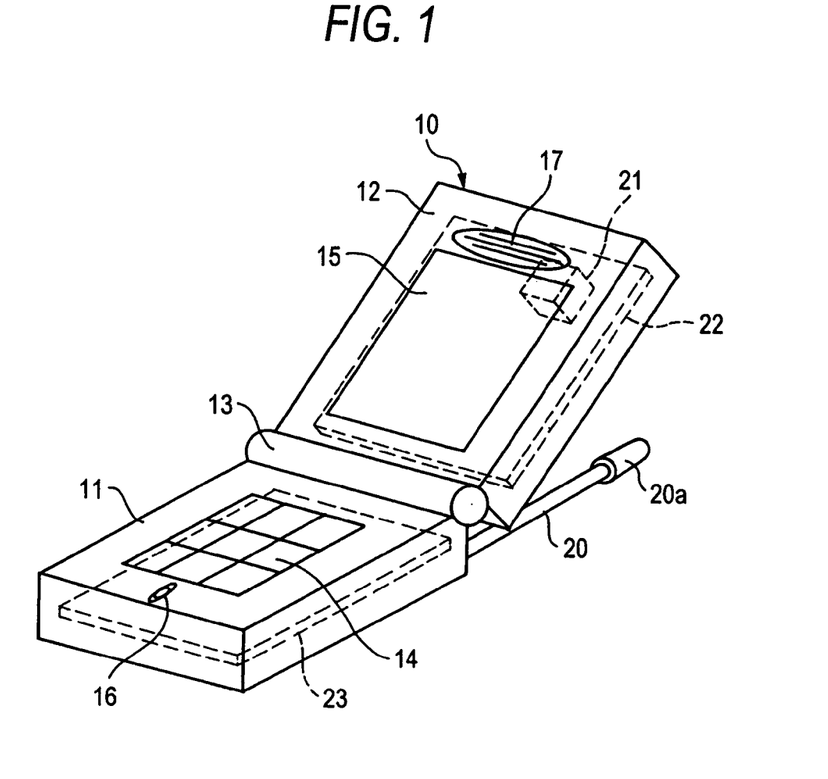
FIG. 1 is a perspective view of a portable radio device of a foldable type according to a first embodiment of the present invention which is shown in an open state.

FIG. 1 is a perspective view of a portable radio device according to a first embodiment of the present invention. A portable radio device 10 according to the present embodiment is of a foldable type in which an operating part housing 11 which is a first part housing and a display part housing 12 which is a second part housing are connected by way of a hinge part 13 so as to be freely folded in such a manner that the display part housing 12 can be held at a desired angle with respect to the operating part housing 11.

There are provided a group of operating buttons 14 on a front face (a face to be covered when both the case bodies 11, 12 are closed is designated as "the front face") of the operating part housing 11, and there is provided a display screen part 15 on a front face of the display part housing 12. There is further provided a microphone hole 16 adjacent to the group of the operating buttons 14 at an opposite side to the display part case (an opposite side to the hinge part), and there is provided a speaker hole 17 adjacent to the display screen part 15 at an opposite side to the operating part housing (an opposite side to the hinge part).

The portable radio device 10 in the present embodiment is provided with two antennas, namely an antenna for cell phone and an antenna for GPS, for the purpose of obtaining GPS receiving function in addition to the function as cell phone. As the cell phone antenna, an antenna 20 capable of extending and contracting is used, while as the GPS antenna, a chip antenna 21 is used. The antennas 20, 21 are arranged in the following manner so that the two antennas may be located as remote as possible from each other.

Specifically, in the present embodiment, the cell phone antenna 20 is provided at a position close to one side in a lateral direction of the operating part housing 11 along a longitudinal direction of the housing 11, and a distal end portion 20a of the antenna which is capable of extending and contracting is provided so as to project at a position free from interfering with the display part housing 12. The chip antenna (the GPS antenna) 21 is provided on a base board 22 which is provided inside the display part housing 12, in an end area ob the base board at an opposite side to the hinge part 13.

Figure 2:
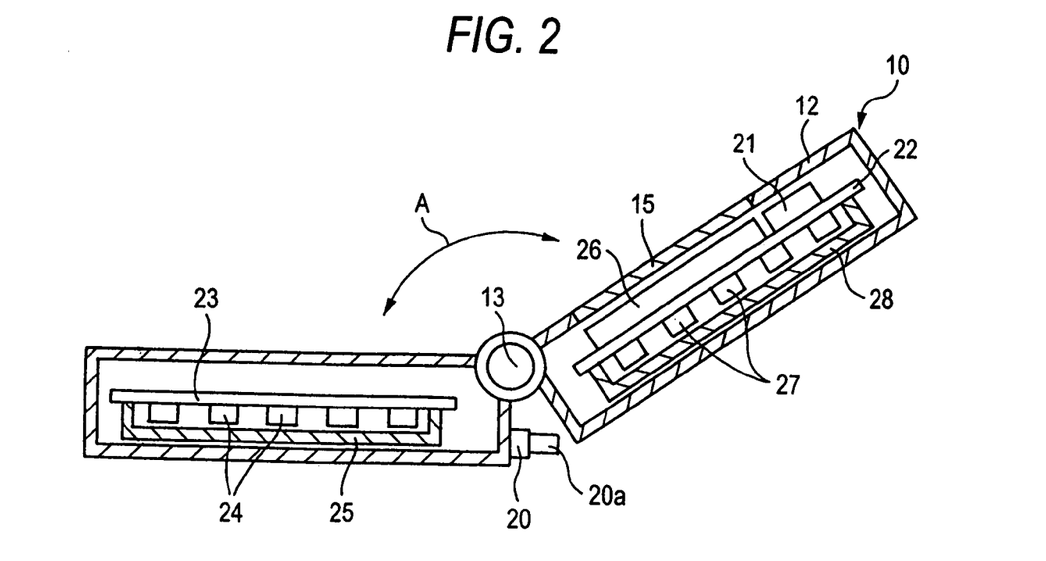
FIG. 2 is a schematic view in vertical section of the portable radio device as shown in FIG. 1.

FIG. 2 is a schematic view in vertical section of the portable radio device 10 as shown in FIG. 1. As described above, the operating part housing 11 and the display part housing 12 are connected by means of the hinge part 13 so as to be opened and closed in directions of a double-head arrow mark A. At one side in a lateral direction of the operating part housing 11, there is provided the antenna 20 capable of extending and contracting for making a call as a phone, and a base board 23 is provided inside the operating part housing 11. To a back face (an opposite side to the group of the operating buttons 14) of the base board 23, is mounted a radio circuit 24 for making a call as a phone. This radio circuit 24 for cell phone is covered with a shielding member 25 inside the housing 11, so that leak of electromagnetic waves emitted from this radio circuit 24 to the exterior can be restrained.

There is also provided the base board 22 in the display part housing 12. A liquid crystal device 26 is attached to a front face of this base board 22, and a display screen of this liquid crystal device 26 can be visually seen through the display screen part (a transparent plate provided for the purpose of looking the display screen on the liquid crystal device 26) 15. To a back face of the base board 22, is mounted a radio circuit 27 for GPS, and this radio circuit 27 is covered with a shielding member 28 inside the housing 12 so that leak of electromagnetic waves emitted from the radio circuit 27 to the exterior can be restrained. The GPS antenna (the chip antenna) 21 is attached to the front face of the base board 22 in an end area of the base board at the opposite side to the operating part housing, that is, at a position remote from the cell phone antenna 20 when the portable radio device 10 of the foldable type is opened.

In the portable radio device 10 having the above described structure, it is to be presumed that the chip antenna 21 for GPS has received GPS data. By setting an open angle between the operating part housing 11 and the display part housing 12 at a desired angle, the chip antenna 21 for GPS can be located at such a position in which the chip antenna 21 is unlikely to be influenced by the cell phone antenna 20. In this case, since a user of the portable radio device 10 usually holds the operating part housing 11 with his hand, the display part housing 12 of the portable radio device 10 in an open state will not be covered with the hand, and deterioration of sensitivities of the respective antennas caused by the hand can be decreased.

Moreover, the radio circuit 27 for GPS and the radio circuit 24 for cell phone are mounted to the separate base boards 22, 23, and respectively covered with the shielding members 28 and 25. Accordingly, electromagnetic noises respectively arising from the radio circuits 27, 24 are shielded with the respective shielding members 28, 25, and influence of one of the radio circuits on the other radio circuit can be effectively restrained, thus enabling performance of the respective radio circuits to be maintained at high level.

Further, since the chip antenna 21 for GPS is mounted to the front face of the base board 22, in a state where the user has opened the portable radio device 10 to see the display screen on the liquid crystal device 26 (in a state where the hinge part 13 is opened), the user of the portable radio device 10 directs the chip antenna 21 for GPS upward (toward the GPS satellite) unconsciously, which results in a condition likely to receive the radio waves.

Moreover, although there are provided the shielding members 25, 28 in the present embodiment, it is possible to construct the case bodies 11, 12 in such a manner that they can be commonly used as the shielding members for interrupting leak of the emitted electromagnetic noises to the exterior. Although the case bodies 11, 12 are usually formed of resin, by applying metal foils to inner faces of the case bodies 11, 12, the shielding members 25, 28 can be omitted.

Figure 3:
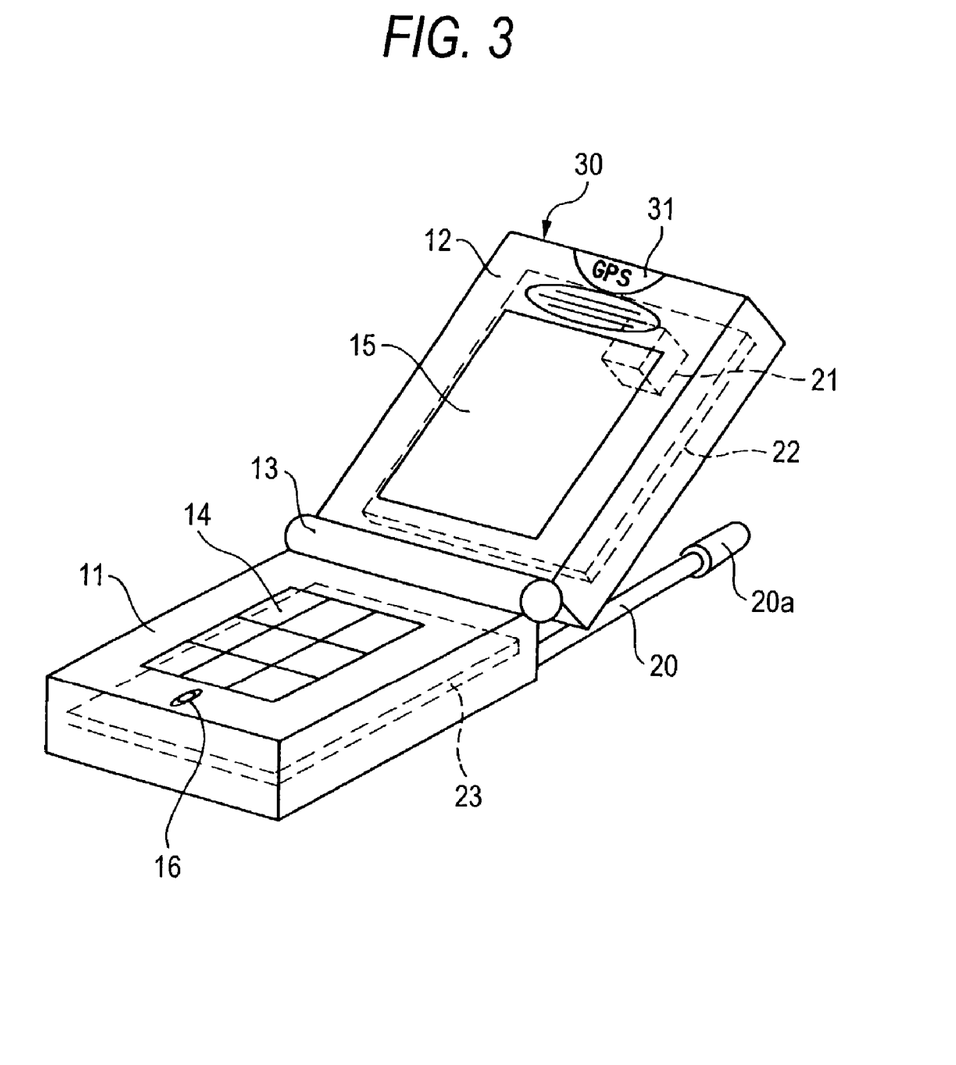
FIG. 3 is a perspective view of a portable radio device of a foldable type according to a second embodiment of the present invention which is shown in an open state.

FIG. 3 is a perspective view of a portable radio device 30 of a foldable type according to a second embodiment of the present invention. The present embodiment is different from the first embodiment in that, as apparent from FIG. 3, a design mark 31 indicating a mounting position of the chip antenna 21 for GPS which has been inevitably incorporated in the display part housing 12 is printed on a corresponding area of the front face of the display part housing 12. Because the user can see the design mark 31, he will be sure not to cover surroundings of the chip antenna 21 for GPS with his hand, and can restrain deterioration of the radio performance of the chip antenna 21 for GPS.

Figure 4:
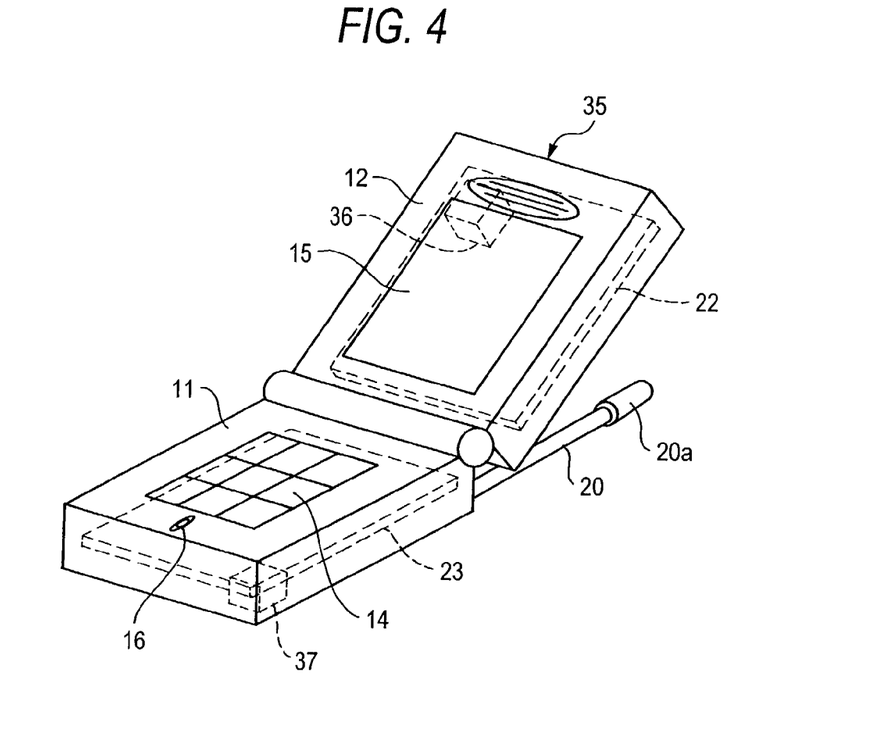
FIG. 4 is a perspective view of a portable radio device of a foldable type according to a third embodiment of the present invention which is shown in an open state.
Figure 5:
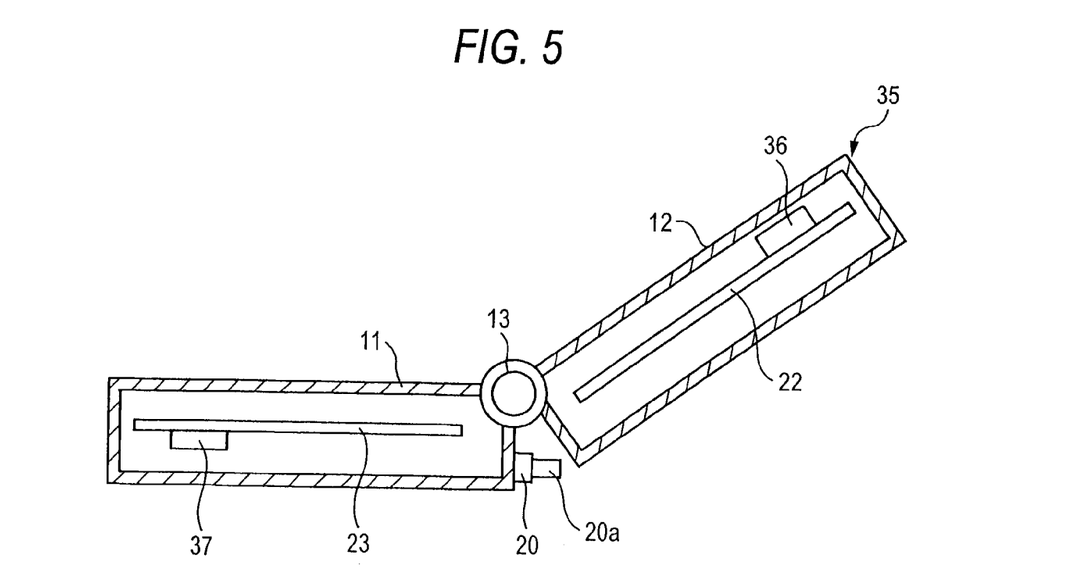
FIG. 5 is a schematic view in vertical section of the portable radio device as shown in FIG. 4.
Figure 6:
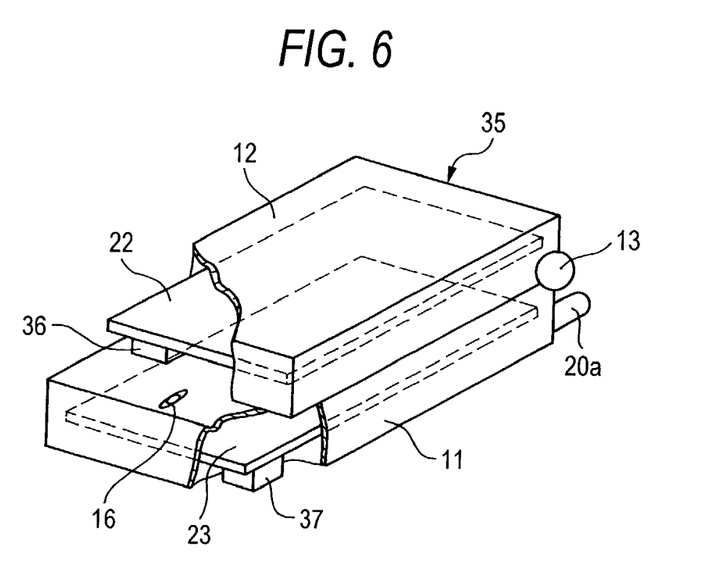
FIG. 6 is a perspective view of the portable radio device as shown in FIG. 4, which is shown in a closed state with its essential part cut away.

FIG. 4 is a perspective view of a portable radio device of a foldable type according to a third embodiment of the present invention which is shown in an open state, FIG. 5 is a schematic view in vertical section of the same, and FIG. 6 is a perspective view of the same in a folded state with its essential part cut away. It is to be noted that the radio circuits shown in FIG. 2 are omitted in FIG. 5. Further, the same members as in the portable radio device in the first embodiment will be denoted with the same reference numerals, and the explanation will be omitted.

A portable radio device 35 in the present embodiment includes an antenna 37 for short-range wireless communication used as a transceiver, in addition to an antenna 20 for cell phone and a chip antenna 36 for GPS. For enabling the three antennas 20, 36, 37 to be installed in the small portable radio device 35, it is contrived in the present embodiment to make the largest spaces between the respective antennas. Firstly, a mounting position of the antenna 20 capable of extending and contracting for cell phone is one side of the operating part housing 11 in a lateral direction, in the same manner as in the first embodiment.

A mounting position of the chip antenna 36 for GPS is a front face of the base board 22 inside the display part housing 12 in an end area of the base board at the opposite side to the hinge part 13, in the same manner as the chip antenna 21 in the embodiment as shown in FIGS. 1 and 2. However, in the present embodiment, the chip antenna 36 for GPS is positioned at the other side (an opposite side to the antenna 20) of the portable radio device 35 in a lateral direction (an upper left corner of the portable radio device 35). In this manner, the antennas 20, 36 are spaced most remote from each other in a lateral direction in a state where the portable radio device 35 is opened.

A mounting position of the antenna 37 for short-range wireless communication is an end area at the opposite side to the hinge part 13 on a back face of the base board 23 inside the operating part housing 11 and one side (the same side as the antenna 20) of the portable radio device 35 in a lateral direction. In this manner, the antenna 37 is located on a lower right corner of the portable radio device 35, and the antennas 36, 37 are spaced most remote from each other in a state where the portable radio device 35 is opened. Although the antenna 20 and the antenna 37 are located at the same side of the portable radio device in a lateral direction, it does not matter because the user will not use the cell phone and the transceiver at the same time (because the antenna 20 and the antenna 37 are not used at the same time).

As described above, according to the present embodiment, even though the three antennas 20, 36, 37 are installed in the small portable radio device 35, they are arranged so as to be spaced most remote from one another, and so, deterioration of the radio performances can be decreased.

Figure 7:
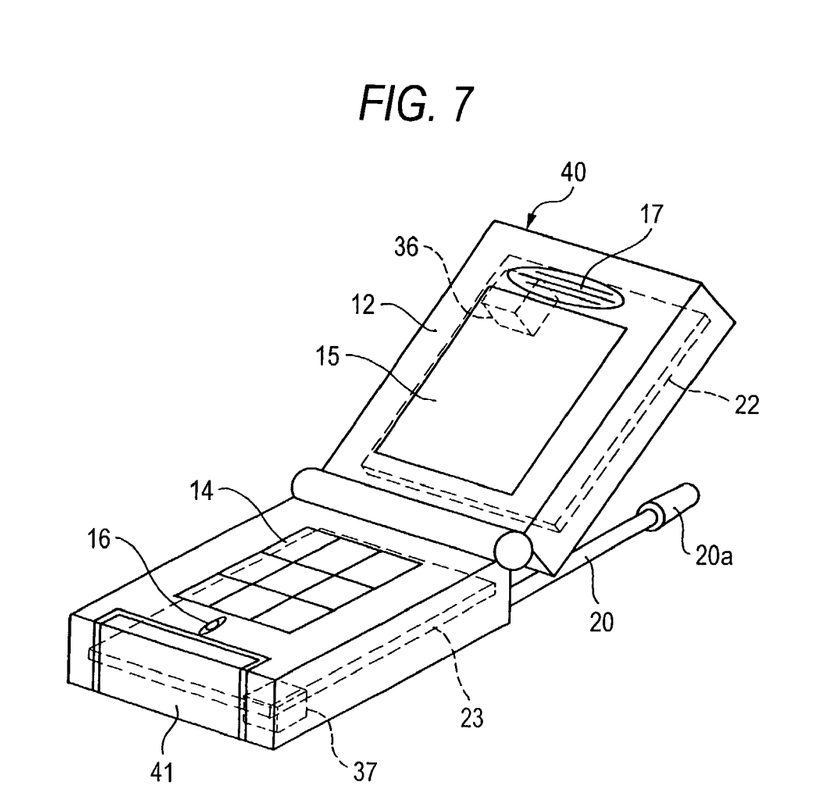
FIG. 7 is a perspective view of a portable radio device of a foldable type according to a fourth embodiment of the present invention which is shown in an open state.

FIG. 7 is a perspective view of a portable radio device 40 according to a fourth embodiment of the present invention which is shown in an open state. Although the present embodiment is essentially the same as the third embodiment, the present embodiment is different from the third embodiment in that, as apparent from FIG. 7, a design mark 41 indicating the mounting position of the chip antenna 36 for short-range wireless communication which has been inevitably incorporated in the operating part housing 11 is printed on a corresponding area of the front face of the operating part housing 11. Because the user can see the design mark 41, he will be sure not to cover surroundings of the chip antenna 36 with his hand, and can restrain deterioration of the radio performance of the chip antenna 36.

Figure 8:
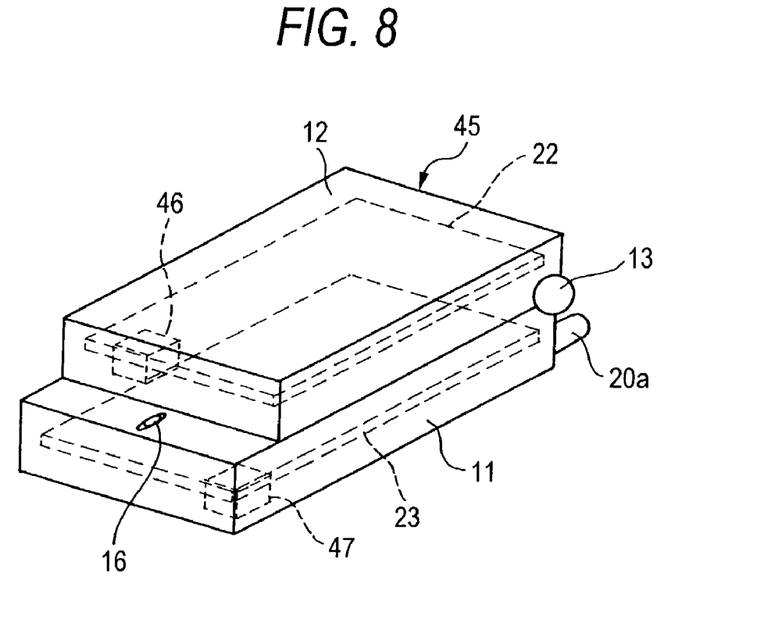
FIG. 8 is a perspective view of a portable radio device of a foldable type according to a fifth embodiment of the present invention which is shown in a closed state.
Figure 9:
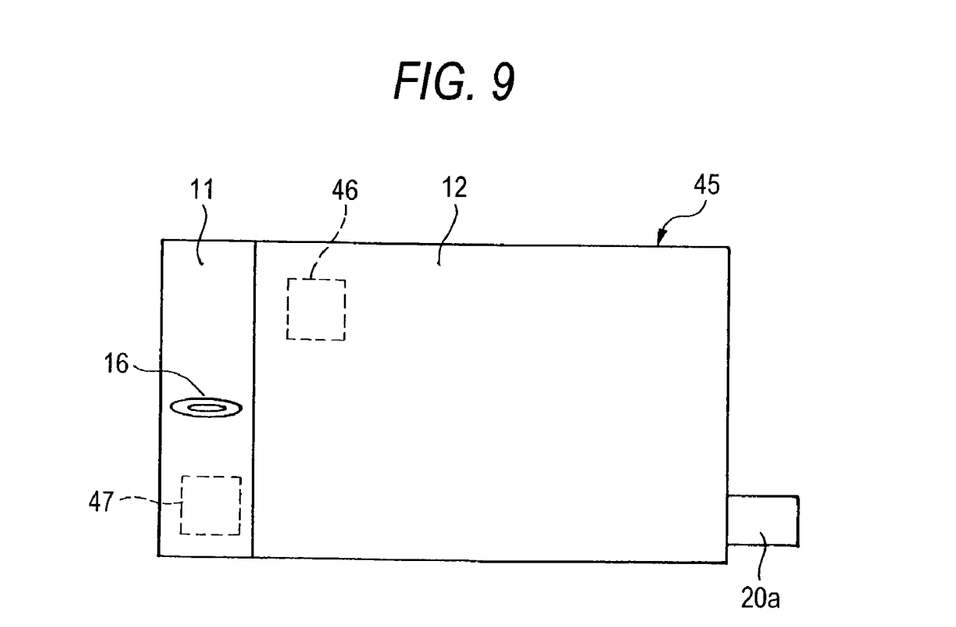
FIG. 9 is a plan view of the portable radio device as shown in FIG. 8.

FIG. 8 is a perspective view of a portable radio device 45 according to a fifth embodiment of the present invention which is shown in a closed state, and FIG. 9 is a plan view of the same. The GPS data are received and dealt with not only in the open state but also in the closed state of the portable radio device 45. For this reason, in the present embodiment, a length of the operating part housing 11 (a distance between the hinge part 13 and the antenna 47 for short-range wireless communication) is made longer than a length of the display part housing 12 (a distance between the hinge part 13 and the chip antenna 46 for GPS, so that the chip antenna 46 for GPS may be spaced from the chip antenna 47 for short-range wireless communication. It is also possible to make the length of the operating part base body 11 longer so as to make both the antennas displaced. By arranging in this manner, condition for receiving the GPS data in the closed state of the portable radio device 45 will be improved.

Although the present invention has been described in detail with reference to the specified embodiments, it is apparent to those skilled in the art that various changes and modifications can be added without departing from the spirit and scope of the present invention.

The present application is based on Japanese Patent Application filed on Apr. 13, 2001 (Patent Application No. 2001-115631), and the contents of the application are hereby incorporated by reference.

According to the present invention, in the portable radio device provided with a plurality of the antennas, the respective antennas are arranged so as to be spaced from one another as remote as possible. As the results, deterioration of the radio performances can be restrained, and also, it is possible to conduct radio communication and reception in a favorable manner. Moreover, by providing the GPS data receiving antenna on the display part housing which is not covered with hand during use, deterioration of receiving capability of the GPS data receiving antenna can be restrained.

What is claimed is:

1. A portable radio device for calling and receiving GPS data comprising:
   an operating part housing;
   a display part housing; and
   a hinge part;
   wherein said operating part housing and said display part housing are connected via said hinge part, and
   wherein either one of said operating part housing or said display part housing is provided with an antenna for calling and the other is provided with an antenna for receiving the GPS data.

2. The portable radio device according to claim 1,
   wherein a design mark indicating a mounting position of said GPS data receiving antenna is attached to a front face of said housing.

3. A portable radio device for making a call and receiving GPS data comprising:
   an operating part housing;
   a display part housing;
   a hinge part;
   a first antenna for calling;
   a second antenna for short-range wireless communication; and
   a GPS data receiving antenna for receiving GPS data;
   wherein said operating part housing and said display part housing are connected via said hinge part, and
   wherein said first antenna and said second antenna are provided on either one of said operating part housing and said display part housing, and said GPS data receiving antenna is provided on the other.

4. The portable radio device according to claim 2,
   wherein said first antenna and said second antenna are provided on said operating part housing, and said GPS data receiving antenna is provided on said display part housing.

5. The portable radio device according to claim 4, wherein a distance between a rotation axis of said hinge part and said second antenna is different from a distance between said rotation axis and said GPS data receiving antenna.

6. The portable radio device according to claim 3, wherein a design mark indicating a mounting position of said second antenna is attached to a surface of said housing.

7. A portable radio device for making a call and receiving GPS data comprising:
an operating part housing;
a display part housing; and
a hinge part;
wherein said operating part housing and said display part housing are connected via said hinge part, and
wherein an antenna for calling is provided at one side of said operating part housing in a lateral direction, and a GPS data receiving antenna for receiving the GPS data is mounted to a base board inside said display part housing in an end area of the base board at an opposite side to said hinge part.

8. The portable radio device according to claim 7, wherein said GPS data receiving antenna is provided at the other side of said display part housing in a lateral direction which is an opposite side displaced from said one side.

9. The portable radio device according to claim 7, wherein a radio circuit for calling is mounted to said base board provided in said operating part housing, and
wherein a GPS data receiving radio circuit for receiving GPS data is mounted to said base board provided in said display part housing.

10. The portable radio device according to claim 9, further comprising:
shielding means for covering said radio circuit for calling; and
shielding means for covering said GPS data receiving radio circuit for receiving GPS data.

11. The portable radio device according to claim 7, wherein said GPS data receiving antenna is mounted to said base board inside said display part housing in a side of said display part.

12. The portable radio device according to claim 7, wherein a design mark indicating a mounting position of said OPS data receiving antenna is attached to a front face of said housing.

13. A portable radio device for making a call and receiving GPS data comprising:
an operating part housing;
a display part housing;
a hinge part;
a first antenna for calling;
a second antenna for short-range wireless communication; and
a GPS data receiving antenna for receiving GPS data;
wherein said operating part housing and said display part housing are connected via said hinge part, and
wherein said first antenna and said second antenna are provided on said operating part housing, and said GPS data receiving antenna is provided on said display part housing,
wherein said first antenna is provided at one side of said operating part housing in a lateral direction,
wherein said GPS data receiving antenna is mounted to a base board inside said display part housing in an end area of the base board at an opposite side to said hinge part, and
wherein said second antenna is provided on a base board inside said operating part housing in an end area of the base board at an opposite side to said hinge part and at the other side of said operating part housing in a lateral direction opposite to said one side.

14. The portable radio device according to claim 6, wherein a distance between a rotation axis of said hinge part and said second antenna is different from a distance between said rotation axis and said GPS data receiving antenna.

15. A portable radio device for making a call and receiving OPS data comprising:
an operating part housing;
a display part housing;
a hinge part;
a first antenna for calling;
a second antenna for short-range wireless communication; and
a GPS data receiving antenna for receiving GPS data;
wherein said operating part housing and said display part housing are connected via said hinge part,
wherein said first antenna and said second antenna are provided on said operating part housing, and said GPS data receiving antenna is provided on said display part housing,
wherein a distance between a rotation axis of said hinge part and said second antenna is different from a distance between said rotation axis and said GPS data receiving antenna, and
wherein a length of said operating part housing is different from a length of said display part housing, so that the distance between said rotation axis of said hinge part and said second antenna may be different from the distance between said rotation axis and said GPS data receiving antenna.

16. A portable radio device for making a call and receiving GPS data comprising:
an operating part housing;
a display part housing;
a hinge part;
a first antenna for calling;
a second antenna for short-range wireless communication; and
a GPS data receiving antenna for receiving GPS data;
wherein said operating part housing and said display part housing are connected via said hinge part, and
wherein said first antenna and said second antenna are provided on said operating part housing, and said GPS data receiving antenna is provided on said display part housing,
wherein said first antenna is provided at one side of said operating part housing in a lateral direction,
wherein said GPS data receiving antenna is mounted to a base board inside said display part housing in an end area of the base board at an opposite side to said hinge part,
wherein said second antenna is provided on a base board inside said operating part housing in an end area of the base board at an opposite side to said hinge part and at the other side of said operating part housing in a lateral direction opposite to said one side, wherein a distance between a rotation axis of said hinge part and said second antenna is different from a distance between said rotation axis and said GPS data receiving antenna, wherein a length of said operating part housing is different from a length of said display part housing, so that the distance between said rotation axis of said hinge part and said second antenna may be different from the distance between said rotation axis and said GPS data receiving antenna.

* * * * *

UNITED STATES PATENT AND TRADEMARK OFFICE
CERTIFICATE OF CORRECTION

| | |
|---|---|
| PATENT NO. | : 7,228,112 B2 |
| APPLICATION NO. | : 10/311363 |
| DATED | : June 5, 2007 |
| INVENTOR(S) | : Yasuhiko Ota et al. |

Page 1 of 1

It is certified that error appears in the above-identified patent and that said Letters Patent is hereby corrected as shown below:

In column 9, line 48, please delete "OPS" and insert therefor
--GPS--

In column 10, line 16, please delete "OPS" and insert therefor
--GPS--

Signed and Sealed this

Eighteenth Day of December, 2007

JON W. DUDAS
*Director of the United States Patent and Trademark Office*